Dec. 5, 1950     J. MILLMAN     2,532,566
PHOTOELECTRIC GATE CONTROL FOR PULSE-ECHO SYSTEMS
Filed Oct. 26, 1945
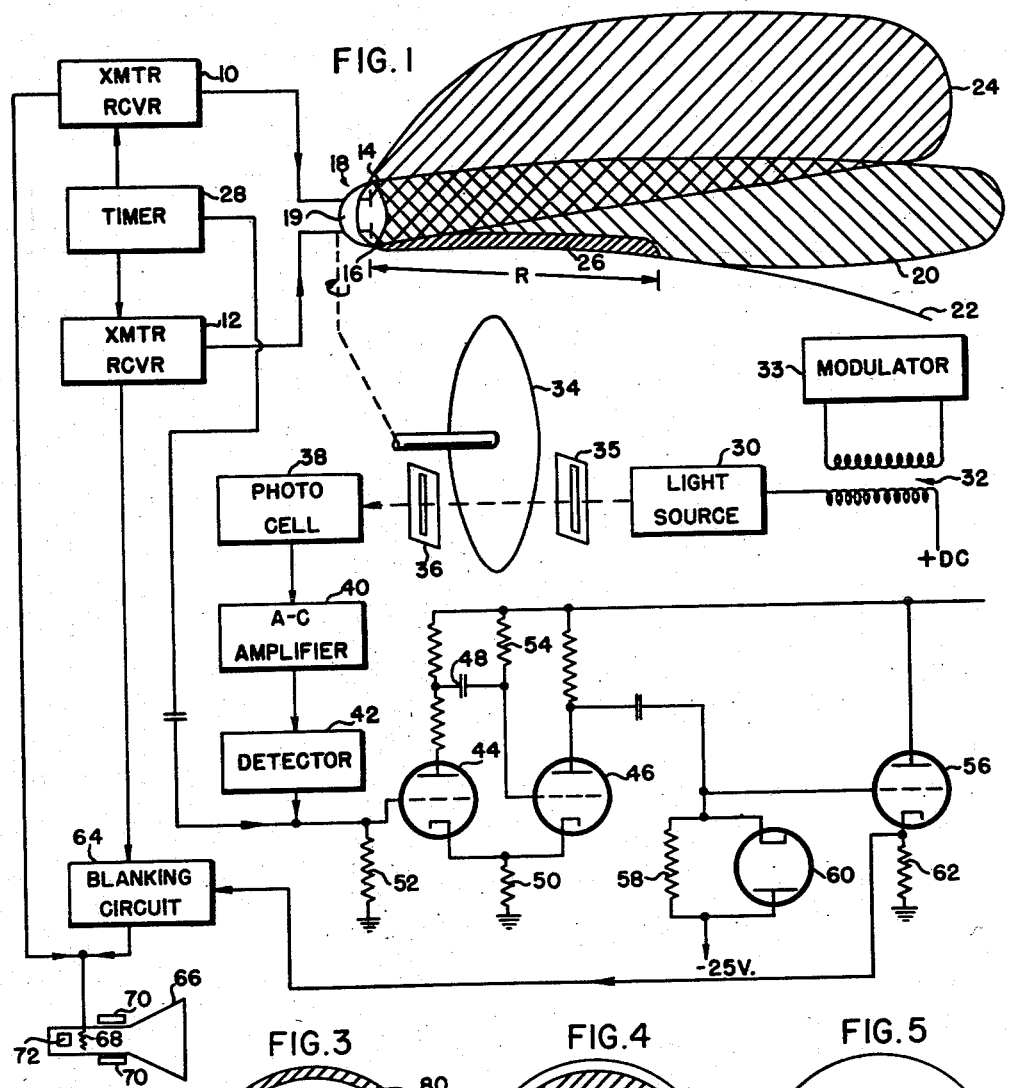
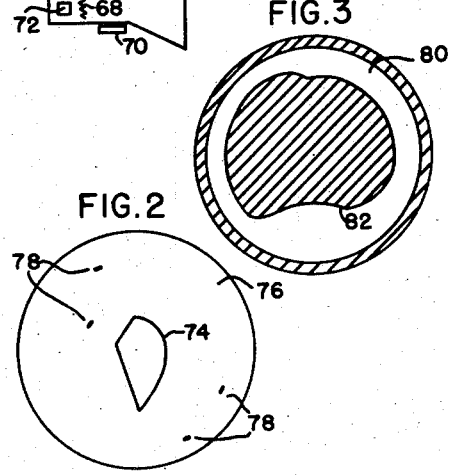
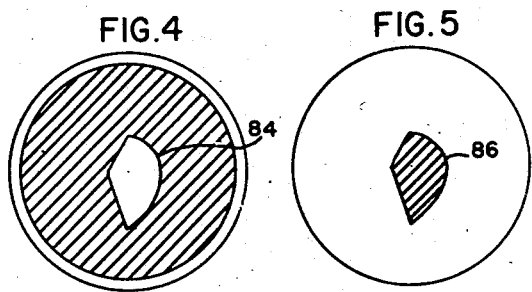
INVENTOR.
JACOB MILLMAN
BY William D. Hall.
ATTORNEY Patented Dec. 5, 1950

2,532,566

UNITED STATES PATENT OFFICE 2,532,566

PHOTOELECTRIC GATE CONTROL FOR PULSE-ECHO SYSTEMS

Jacob Millman, Brookline, Mass., assignor, by mesne assignments, to the United States of America as represented by the Secretary of War Application October 26, 1945, Serial No. 624,909

5 Claims. (Cl. 343—5)

1

This invention relates generally to electrical apparatus and more particularly to a photoelectric means for controlling the duration of a periodic voltage pulse in accordance with predetermined requirements.

In one method of radio object location a directive beam of electromagnetic pulses is radiated by an antenna, and reflecting objects intercepted by this beam return echo pulses which are applied to an indicator in such a manner as to show the positions of these objects. If the beam is wide in the vertical plane and closely grazes the surface of the earth, objects at low elevations and considerable range will be detected, but nearby objects at all elevations will be obscured by echoes reflected from trees, buildings, and other objects on the ground in the vicinity of the apparatus. Such obscuring echoes are known as ground clutter.

One means of eliminating this disadvantage consists of employing a plurality of beams having different elevations. Echoes from each of these beams are passed through separate channels, and since reflections from ground objects near the transmitter occur only in the case of the lower beam, they may be eliminated by electrically blocking this channel for the short period after the transmitted pulse during which period these ground echoes are received. Since the distance to which this ground clutter extends usually varies with azimuth, means have been devised for mechanically varying the length of the blocking time in accordance with changes in the azimuth of the directive antenna. One method involves the use of a cam, the shape of which is determined by the contour of the existing ground clutter and which is rotated in synchronism with the azimuth rotation of the antenna of the system. The use of the cam involves the difficulties of quickly producing a cam to fit a given location and the disadvantage that a plurality of moving mechanical parts is required.

It is an object of the present invention to provide a novel system for controlling the elimination of ground clutter in a radio object-locating system. It is a further object to arrange said system so that it has a minimum number of moving mechanical parts. It is another object to adapt said system so as to be easily and quickly modifiable in accordance with changes caused by alteration of the site.

The invention in general contemplates regulating the amount of light falling on a photoelectric device by means of a disc shaped according to the contour of the existing ground clutter. The output from this photoelectric device is then amplified and used to regulate the production of a blanking voltage pulse.

Further objects, features and advantages of this invention will suggest themselves to those skilled in the art and will become apparent from the following description of the invention taken in connection with the accompanying drawings in which:

Fig. 1 shows a system embodying the principles of the present invention;

Fig. 2 shows a typical ground clutter pattern on the indicator of one type of object-locating system; and Figs. 3, 4, and 5 show various types of disks which may be used for purposes of the invention.

Reference is made now more particularly to Fig. 1, in which two transmitter-receivers 10 and 12 feed dipole radiators 14 and 16, respectively, of antenna 18, which also includes reflector 19. These antenna elements are so arranged that dipole 16 radiates a beam 20 which is low in elevation and closely grazes the surface of the earth 22, and dipole 18 radiates a beam 24 which lies above and in the same vertical plane as beam 20. Area 26 represents that portion of beam 20 which is intercepted by ground objects and gives rise to ground clutter extending to a range R. Timer 28 provides a keying pulse to the transmitter-receivers 10 and 12.

A light source 30 is supplied with direct voltage, upon which is superimposed an A.-C. variation through the secondary of a transformer 32. The primary of transformer 32 is supplied by voltage from modulator 33, which may be an A.-C. source of any convenient frequency. Light source 30 in the preferred embodiment consists of a high-voltage low-current device which will respond rapidly to variations in applied voltage. The light from source 30 passes through a slit 35, a rotatable disk 34, and a second slit 36 parallel to slit 35 and strikes photo cell 38. Disk 34 is coupled to antenna 18 either mechanically, or electrically by means of Selsyns or the like, in such a way that it rotates in synchronism with the azimuthal rotation of antenna 18. Disk 34 contains transparent and opaque portions, the contour and size of which are determined in a manner to be subsequently described.

The output from photo cell 38 is applied to an A.-C. amplifier 40, which in turn supplies the input for detector 42. The D.-C. output of detector 42 is applied as a bias to the grid of triode 44, to which is also applied a positive voltage trigger pulse from timer 28.

Triodes 44 and 46 and their associated circuits form a cathode-coupled multivibrator which is sometimes known as a one-shot or start-stop multivibrator, and which requires a trigger pulse for proper operation. The plate circuit of triode 44 is coupled to the grid circuit of triode 46 by a capacitor 48, and a common cathode resistor 50 serves to couple the cathodes of the two triodes. Triode 44 has a grid resistor 52, while the grid of triode 46 is connected through a resistor 54 to a source of positive potential. The output square wave from the plate of triode 46 is applied to the grid of a cathode follower triode 56, which is also connected through the parallel combination of resistor 58 and diode 60 to a source of negative bias voltage. Blanking pulses obtained across the cathode resistor 62 of triode 56 are applied to a blanking circuit 64, which may consist of a pentode amplifier so biased that when a positive blanking pulse is applied to its cathode, it is cut off and passes no signal. Video pulses from transmitter-receiver 12 are applied to the input of blanking circuit 64, and the output of the blanking circuit, together with video pulses from transmitter-receiver 10, is applied to cathode ray tube indicator 66.

In the preferred embodiment, cathode ray tube indicator 66 may be of the plan position indicator (PPI) type. In this type of indication, the electron beam is swept radially from the center of the tube to the periphery, and this sweep is rotated about its point of origin in synchronism with the azimuthal rotation of the directive antenna of the system. Video pulses are caused to intensify the electron beam at the time they are received, so that the range and azimuth of a reflecting object may be determined from the position of its indication on the screen of the indicator. For this type of presentation video pulses from blanking circuit 64 and transmitter-receiver 10 are applied to the control grid 68 of cathode ray tube 66. Cathode ray tube 66 also includes beam deflection means 70 and cathode 72.

Fig. 2 shows the appearance of a typical presentation on the face of a PPI indicator without blanking. Area 74 is the luminous area caused by ground clutter, in which object indications are difficult or impossible to distinguish. This applies to targets intersected by the upper as well as by the lower beam, since echo pulses from both beams are combined and applied to the indicator. Area 76 is the non-luminous area in which it is possible to observe target indications 78.

The transparent and opaque portions of disc 34 of Fig. 1 may be so formed that if any radius is considered, the extent of the transparent portion along this radius will be proportional to the distance to which ground clutter extends at the corresponding azimuth. By corresponding azimuth is meant the azimuth at which the antenna 18 is directed at the time the given element of disk 34 is between slits 35 and 36.

Fig. 3 shows one means of constructing disk 34 to fulfill the above requirement. Area 80 is the transparent portion of the disk of Fig. 3 and is so shaped that along any radius the extent of the transparent portion is proportional to the range to which ground clutter is observed at the corresponding azimuth on the indicator screen of Fig. 2. Shaded area 82 represents the opaque portion of the disk. The disk may be constructed of any transparent material, such as Celluloid or plastic, and the opaque area 82 may be formed by affixing a layer of any opaque material to the surface of the disk, or by painting the desired area with some opaque substance.

Fig. 4 shows an alternative form for disk 34 of Fig. 1. In this embodiment the transparent portion 84 is in the central part of the disk rather than around the periphery. As can be seen, this permits the transparent portion to have the same contour as the actual ground clutter pattern appearing on the face of the indicator. If the disk is made in this way, it may conveniently be produced photographically. By photographing the indicator screen of Fig. 2 and producing a positive print on some transparent material, the bright central region 74 of the screen of Fig. 2 would be reproduced in detail to form the transparent portion 84 of the disk of Fig. 4.

Fig. 5 shows a similar disk made by a photographic process such as described in connection with Fig. 4, except that a negative rather than a positive print has been made on the transparent material, so that central region 86 becomes opaque.

When the apparatus of Fig. 1 is in operation, timer 28 applies a periodic keying pulse to transmitter-receivers 10 and 12 and causes them simultaneously to transmit pulses of R.-F. energy through dipole radiators 14 and 16, respectively. Beam 24 transmitted by dipole 14 intersects no ground objects, and echo pulses from this beam are received by dipole 14, detected and amplified by transmitter-receiver 10, and applied to control grid 68 of cathode ray indicator 66.

Periodic variation is produced in the intensity of the light source 30 by the alternating voltage from modulator 33, which is superimposed on the direct voltage supplied to the light source. This variation may be of any convenient frequency, for example, 5000 cycles per second. Disk 34 is turned in synchronism with antenna 18, so that if the disk has been formed as shown in Figs. 3 or 4, the extent of the transparent portion included between slits 35 and 36 is continuously proportional to the extent of the ground clutter at the azimuth toward which the antenna points. Thus the average value of the intensity of the light falling on photoelectric cell 38 and the average value of the alternating component of voltage supplied to A.-C. amplifier 40 are proportional to the extent of the ground clutter. Amplifier 40 should have relatively high gain due to the small magnitude of the signal applied to it, and hence A.-C. modulation of light source 30 is employed to enable an A.-C. amplifier to be used.

The output of A.-C. amplifier 40 is applied to detector 42, the positive D.-C. output of which is applied as a bias to the grid of triode 44. This bias is thus made proportional to the extent of ground clutter. The operation of the multivibrator including triodes 44 and 46 is similar to the operation of an ordinary multivibrator. Positive trigger pulses from timer 28 applied to the grid of triode 44 serve to render this tube conductive which in turn causes triode 46 to be cut off. The length of time for which this condition exists varies linearly with the magnitude of the direct voltage applied to the grid of triode 44. At the end of this period the multivibrator reverts to its original state in which triode 46 is conductive and triode 44 is cut off. This operation causes a positive rectangular voltage pulse of variable duration to be produced at the plate of triode 46.

This square wave is applied to the grid of cathode follower 56, which is caused to be cut off during the absence of this positive square wave by the negative bias applied to it through resistor 58 and diode 60. The parallel arrangement of resistor 58 and diode 60 serves to stabilize the quiescent grid potential of triode 56 at the value determined by the source of negative bias voltage. If this arrangement were not employed the quiescent grid potential of triode 56 would be dependent upon the duration of the positive square wave applied from the plate of triode 46.

As can be seen, the duration of the square wave applied to the grid of triode 56 is proportional to the extent of ground clutter at the corresponding azimuth. By properly choosing the gain of amplifier 40 and the circuit constants of the multivibrator, the constant of proportionality may be made such that the duration of the square wave is continually equal to the length of the time interval during which ground clutter is received. When this positive square wave is applied from cathode follower 56 to blanking circuit 64, the latter circuit is unable to pass signals for the duration of the wave. Therefore, since this square wave is initiated at the time a trigger pulse is supplied from timer 28, blanking circuit 64 will not pass video pulses which are received during the time that the interference is being obtained from ground clutter.

Echoes received from beam 20 through dipole 16 are detected and amplified in transmitter-receiver 12 and applied to blanking circuit 64. Echo pulses received from this beam within the range of ground clutter are not passed by blanking circuit 64, and as a result ground clutter is eliminated from the signals applied to control grid 68 of cathode ray tube indicator 66. At the same time sensitivity for signals obtained from the upper beam within the range of ground clutter is retained.

It will be obvious that the disk of Fig. 5 could also be used in this apparatus provided some inverting arrangement were made. For example, the rectifying means of detector 42 might be reversed so that the detector output would be of a negative rather than positive polarity, and this output could be combined with a constant D.-C. potential in the grid circuit of triode 44 to produce the required variation of grid bias.

It will also be obvious that it would not be necessary to employ A.-C. modulation of the light source, provided it were made of sufficient intensity and suitable condensing means were used, so that the signal supplied by photoelectric cell 38 would be of larger amplitude and could be amplified by a D.-C. rather than an A.-C. amplifier.

The present invention contains several inherent advantages. The gate control system contains but a single moving part and there is a minimum of frictional wear. Furthermore, the disks described above may be quickly and cheaply produced to fit varying conditions, and they are able easily to compensate for very rapid variations of ground clutter range with azimuth.

While there has been described what is at present considered to be the preferred embodiment of this invention, it will be obvious to those skilled in the art that various changes and modifications may be made therein without departing from the spirit of the invention as set forth in the appended claims.

The invention claimed is:

1. In combination, a plurality of transmitter-receiver means for transmitting a plurality of beams of electromagnetic pulses and for receiving and producing a video pulse output from electromagnetic echo pulses, indicating means, a light source, means for periodically varying the intensity of said light source, a photoelectric cell, means for regulating the amount of light from said light source which is applied to said photoelectric cell in accordance with predetermined requirements, amplification means associated with the output of said photoelectric cell for amplifying the periodic component of said output, a detector associated with the output of said amplification means, means for utilizing the output of said detector to produce a periodic voltage pulse the duration of which varies linearly with the magnitude of the output from said detector, means for utilizing said periodic voltage pulse to effect the application of a selected portion of the video pulse output of certain of said transmitter-receiver means to said indicating means, and means for applying the video pulse output of the remainder of said transmitter-receiver means to said indicating means.

2. In combination, a plurality of transmitter-receiver means for transmitting a plurality of beams of electromagnetic pulses and for receiving and producing a video pulse output from electromagnetic echo pulses, indicating means, a light source, a photoelectric cell, means for regulating the amount of light from said light source which is applied to said photoelectric cell in accordance with predetermined requirements, means for utilizing the output of said photoelectric cell to produce a periodic voltage pulse the duration of which varies linearly with the magnitude of the output from said photoelectric cell, means for utilizing said periodic voltage pulse to effect the application of a selected portion of the video pulse output of certain of said transmitter-receiver means to said indicating means, and means for applying the video pulse output of the remainder of said transmitter-receiver means to said indicating means.

3. In combination, a plurality of transmitter-receiver means for transmitting a plurality of beams of electromagnetic pulses and for receiving and producing a video pulse output from electromagnetic echo pulses, indicating means, means for photoelectrically controlling the production of a periodic voltage pulse the duration of which varies according to predetermined requirements, means for utilizing said periodic voltage pulse to effect the application of a selected portion of the video pulse output of certain of said transmitter-receiver means to said indicating means, and means for applying the video pulse output of the remainder of said transmitter-receiver means to said indicating means.

4. The combination set forth in claim 1, wherein said regulating means includes a partially opaque disc, the opaque portion of said disc outlining the ground clutter area surrounding the transmitter-receiver means, and means for rotating said disc and said transmitter-receiver means in synchronism.

5. The combination set forth in claim 2, wherein said regulating means includes a partially opaque disc, the opaque portion of said disc outlining the ground clutter area surrounding the transmitter-receiver means, and means for rotating said disc and said transmitter-receiver means in synchronism.

JACOB MILLMAN.

REFERENCES CITED

The following references are of record in the file of this patent:

UNITED STATES PATENTS

| Number | Name | Date |
|---|---|---|
| 1,915,993 | Handel | June 27, 1933 |
| 1,977,875 | Donaldson | Oct. 23, 1934 |
| 2,208,209 | Busignies | July 16, 1940 |
| 2,278,692 | Eller | Apr. 7, 1942 |
| 2,403,527 | Hershberger | July 9, 1946 |
| 2,412,669 | Bedford | Dec. 17, 1946 |
| 2,412,670 | Epstein | Dec. 17, 1946 |

FOREIGN PATENTS

| Number | Country | Date |
|---|---|---|
| 515,567 | Great Britain | Dec. 8, 1939 |